(12) United States Patent
Fuchs

(10) Patent No.: US 10,807,856 B2
(45) Date of Patent: Oct. 20, 2020

(54) FUEL FILLING DEVICE

(71) Applicant: MAGNA STEYR Fuel Systems GesmbH, Sinabelkirchen (AT)

(72) Inventor: Thomas Fuchs, Sinabelkirchen (AT)

(73) Assignee: MAGNA Energy Storage Systems GesmbH, Sinabelkirchen (AT)

( * ) Notice: Subject to any disclaimer, the term of this patent is extended or adjusted under 35 U.S.C. 154(b) by 87 days.

(21) Appl. No.: 16/207,364

(22) Filed: Dec. 3, 2018

(65) Prior Publication Data

US 2019/0270634 A1 Sep. 5, 2019

(30) Foreign Application Priority Data

Mar. 2, 2018 (EP) ..................................... 18159688

(51) Int. Cl.
  *B60K 15/04* (2006.01)
  *B67D 7/54* (2010.01)
  *B60K 15/03* (2006.01)

(52) U.S. Cl.
  CPC ................ *B67D 7/54* (2013.01); *B60K 15/04* (2013.01); *B60K 2015/0344* (2013.01); *B60K 2015/03394* (2013.01); *B60K 2015/047* (2013.01)

(58) Field of Classification Search
  CPC ............ B60K 15/04; B60K 2015/0344; B60K 2015/047; B60K 2015/03394; B60K 2015/0461; B60K 2015/0458; B67D 7/54
  See application file for complete search history.

(56) References Cited

U.S. PATENT DOCUMENTS

2016/0272063 A1* 9/2016 Sekihara ................ B60K 15/04

FOREIGN PATENT DOCUMENTS

| DE | 19948312 A1 | 4/2001 |
| DE | 102015214084 A1 | 8/2016 |
| JP | 2015143043 A | 8/2015 |

* cited by examiner

*Primary Examiner* — Craig M Schneider
*Assistant Examiner* — Jason K Niesz
(74) *Attorney, Agent, or Firm* — Jordan IP Law, LLC; Todd A. Vaughn

(57) ABSTRACT

A fuel filler device that includes a flow conduction device arranged in a filler line and configured such that during a filling, an outlet pipe of a pump nozzle is guided and supported therein, and an attachment connected to the flow conduction device. The attachment includes a first attachment end, a second attachment end, and a constriction extending between the first attachment end and the second attachment end such that the attachment tapers from the first attachment end to the second attachment end via the constriction. At least one first gap is formed between the first attachment end and the flow conduction device so that during a filling sequence, fuel vapour introduced into the fuel filler device may flow through the at least one first gap into the filler line in a direction of a fuel tank connected to the filler line.

17 Claims, 1 Drawing Sheet

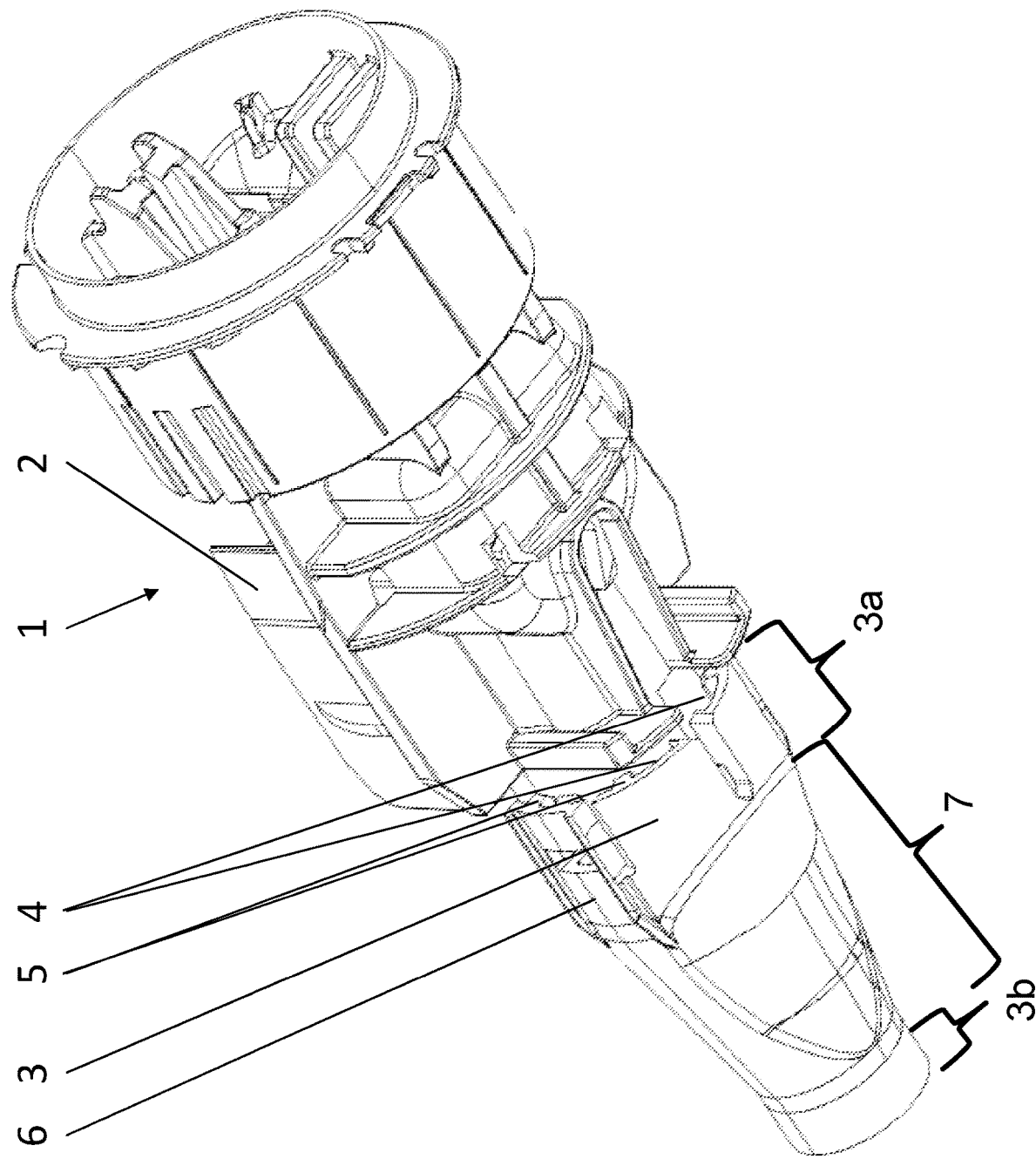

FUEL FILLING DEVICE

CROSS-REFERENCE TO RELATED APPLICATIONS

The present application claims priority 35 U.S.C. § 119 to European Patent Publication No. EP 18159688.3 (filed on Mar. 2, 2018), which is hereby incorporated by reference in its entirety.

TECHNICAL FIELD

Embodiments relate to a fuel filler device having a filler line, a flow conduction device, arranged in the filler line, and an attachment for the flow conduction device. The flow conduction device is configured such that during a filling sequence, the outlet pipe of a pump nozzle is guided and supported therein.

BACKGROUND

German Patent Publication No. DE 102008011733A1 discloses a fuel filler device comprising a guidance tube which promotes a laminar flow of the fuel during filling, whereby spit-back of the fuel is reduced even during topping up.

SUMMARY

Embodiments herein relate to an alternative fuel filling system which prevents return flow/spit-back of fuel during a filling sequence, and conforms to the requirements of Onboard Refueling Vapor Recovery (ORVR) regulations.

Embodiments herein relate to a fuel filler device comprising: a filler line; a flow conduction device arranged in the filler line, the flow conduction device being configured such that during filling, an outlet pipe of a pump nozzle is guided and supported therein, and an attachment for the flow conduction device, the attachment having a first end and a second end, the first end being arranged radially on the outside of the flow conduction device. The attachment tapers from the first end to the second end via a constriction.

In accordance with embodiments, at least one gap is formed between the first attachment end and the flow conduction device so that during a filling sequence, fuel vapour introduced into the fuel filler device may flow through the at least one gap into the filler line in the direction of a fuel tank connected to the filler line. The attachment advantageously may have a plurality of gaps between the attachment and the flow conduction device. The gap(s) are to relieve pressure, in particular, when topping up, since fuel or fuel vapour present in the attachment may escape via the gaps into the filler line and be permitted to flow back into the fuel tank via a recirculation line, which may reduce the load on an active charcoal filter (ACF) while simultaneously observing the legally prescribed ORVR regulations. Because of the geometry of the constriction of the attachment, an escape of fuel from the filler line or from the flow conduction device (spit-back) may be prevented.

In accordance with embodiments, the recirculation line may be connected at a first recirculation line end to a main purge line and at a second recirculation line end to the filler line. The second recirculation line end is to open in a region of the filler line which is arranged spatially above the gaps. The main purge line may be connected to the fuel tank. Fuel vapour may flow back from the main purge line to the ACF and/or to the recirculation line.

In accordance with embodiments, because of the constriction, during a filling sequence, a reduced pressure occurs in the filler line such that fuel vapour may flow or be conducted back from the main purge line into the fuel tank via the recirculation line and the filler line.

In accordance with embodiments, the flow conduction device and the attachment connected thereto may be inserted in and connected to the filler line at the upper filler line end of the filler line. The filler line, which in an embodiment may produced by blow-moulding. An upper filler line end has a wider portion in which the flow conduction device and the attachment may be inserted, and tapers towards the second attachment end until the filler line has a cylindrical form which remains substantially unchanged as far as the fuel tank. With this design of the filler line, the suction effect is further amplified. In an embodiment, the first attachment end forms a substantially cylindrical portion.

In accordance with embodiments, at least one spacer rib may be arranged in the first attachment end. The at least one spacer rib is to extend radially inward, i.e., in a direction towards the flow conduction device. In an embodiment, a plurality of spacer ribs may be formed in the cylindrical portion of the attachment, particularly, at regular intervals from each other. A plurality gaps may be formed by the circumferential spacing between the spacer ribs and also by the radial spacing between the first attachment end and the flow conduction device because of the radially-extending spacer ribs. Because of the spacer ribs, the attachment may be positioned in a defined position relative to the flow conduction device.

In accordance with embodiments, alternatively, instead of spacer ribs, continuous bores extending in the axial direction of the cylindrical portion may be provided in the ring surface of the cylindrical portion of the first attachment end.

In accordance with embodiments, the attachment may have at least one latching geometry via which the attachment is to be connected to a counter-latching geometry of the flow conduction device.

In accordance with embodiments, advantageously, the attachment has at least two latching geometries. This achieves a better connection between the attachment and the flow conduction device.

In accordance with embodiments, the constriction of the attachment has a substantially frusto-conical casing surface. In this way, the constriction performs several functions. Firstly, the constriction ensures that spit-back/return flow of the fuel during filling is prevented. Secondly the constriction amplifies the suction/vacuum effect of the gap(s), whereby not only are the legal ORVR requirements fulfilled more easily but the loading of the active charcoal filter is reduced.

In accordance with embodiments, the second attachment end after the constriction may also form a cylindrical portion.

In accordance with embodiments, the flow conduction device may be configured such that the end of the outlet pipe of the filler nozzle cannot protrude beyond the flow conduction device. This has the advantage that during a filling sequence, fuel cannot hit the widened region of the constriction of the attachment, but only the region of the attachment where the second attachment end is arranged. From there, the fuel, which may splash back, is distributed in the direction of the widened constriction and not in the direction of the inlet opening of the fuel filler device. The first attachment end here may have a length such that the spit-back fuel passes through the gap or gaps in the direction of the cavity of the filler line, and cannot escape from the inlet opening of the flow conduction device.

DRAWINGS

Embodiments will be illustrated by way of example in the drawings and explained in the description hereinbelow.

FIG. 1 illustrates a perspective view of a fuel filler device, in accordance with embodiments.

DESCRIPTION

As illustrated in FIG. 1, embodiments relate to a fuel filler device 1 in perspective view, wherein for greater clarity, the filler line has not been shown. The fuel filler device 1 comprises a flow conduction device 2 in which during filling the outlet pipe of a filler nozzle (not shown) is guided and supported. An attachment 3 is connected to the flow conduction device 2 via a latch device 6. By way of example, the latching may be achieved via clipping. Embodiments, however, are not limited thereto and may encompass other suitable releasable or permanent connection, for example, a bayonet closure or welding.

The attachment 3 has a first attachment end 3a formed having a substantially cylindrical cross-section and a second attachment end 3b which is also formed having a substantially cylindrical cross-section. The first attachment end 3a has at least one or a plurality of spaced apart spacer ribs 5 that radially extend from the attachment 3 towards the flow conduction device 2. Due to the circumferential spacing between the spacer ribs 5 and the radial spacing between the cylindrical portion of the first attachment end 3a from the flow conduction device 2 due to the spacer ribs 5, at least one, or alternatively, a plurality of gaps 4 are formed. Due to the gap(s), during a filling sequence, fuel vapour introduced into the fuel filler device may flow through the gap(s) into the filler line in a direction towards a fuel tank connected to the filler line. The gap(s) also advantageously relieve pressure, in particular, when topping up, since fuel or fuel vapour present in the attachment may escape via the gaps into the filler line and be permitted to flow back into the fuel tank via a recirculation line, which may reduce the load on an active charcoal filter (ACF) while simultaneously observing the legally prescribed ORVR regulations. Because of the geometry of the constriction of the attachment, an escape of fuel from the filler line or from the flow conduction device (spit-back) may be prevented.

A constriction 7 with a substantially frusto-conical casing surface is arranged between the first attachment end 3a and the second attachment end 3b. The constriction 7 of the attachment 3, together with the gap(s) 4, ensures that a return flow/spit-back of fuel during filling is prevented, and causes an additional suction effect so that fuel vapour mixes with the fuel via the gaps 4, and thus, may flow into the fuel tank.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SIGNS

1 Fuel filler device
2 Flow conduction device
3 Attachment
3a First attachment end
3b Second attachment end
4 Gap(s)
5 Spacer ribs
6 Latch device
7 Constriction

What is claimed is:

1. A fuel filler device, comprising:
a flow conduction device arranged in a filler line to guide and support an outlet pipe of a pump nozzle during a filling sequence; and
an attachment connected to the flow conduction device, the attachment including a first attachment end, a second attachment end, and a constriction extending between the first attachment end and the second attachment end,
wherein the first attachment end includes at least one spacer rib that extends radially inward towards the flow conduction device to position the attachment relative to the flow conduction device and define at least one gap between the first attachment end and the flow conduction device to relieve pressure during a filling sequence by facilitating flow of fuel vapour introduced into the fuel filler device into the filler line in a direction of a fuel tank which is connected to the filler line.

2. The fuel filler device of claim 1, wherein the first attachment end has a substantially cylindrical cross-section.

3. The fuel filler device of claim 1, wherein the first attachment end is configured for positioning radially on an outer surface of the flow conduction device.

4. The fuel filler device of claim 1, further comprising a latch device configured to connect the attachment to the flow conduction device.

5. The fuel filler device of claim 1, wherein the second attachment end defines a cylindrical portion.

6. The fuel filler device of claim 1, wherein the constriction has a substantially frusto-conical surface.

7. The fuel filler device of claim 1, wherein the constriction tapers from the first attachment end to the second attachment end.

8. The fuel filler device of claim 7, wherein the tapering of the constriction is to facilitate a reduction in pressure in the filler line such that fuel vapour may flow into the fuel tank via the filler line.

9. A fuel filler device, comprising:
a flow conduction device arranged in a filler line to guide and support an outlet pipe of a pump nozzle during a filling sequence; and
an attachment connected to the flow conduction device, the attachment including a first attachment end and a second attachment end, the first attachment end include a plurality of spacer ribs that extend radially inward towards the flow conduction device to position the attachment relative to the flow conduction device and define a plurality of gaps between the first attachment end and the flow conduction device that are configured to relieve pressure during a filling sequence by facilitating flow of fuel vapour introduced into the fuel filler device into the filler line in a direction of a fuel tank which is connected to the filler line.

10. The fuel filler device of claim 9, wherein the spacer ribs are arranged at regular intervals from each other.

11. The fuel filler device of claim 9, further comprising a constriction extending between the first attachment end and the second attachment end.

12. The fuel filler device of claim 11, wherein the constriction tapers from the first attachment end to the second attachment end.

13. The fuel filler device of claim 12, wherein the tapering of the constriction is to facilitate a reduction in pressure in the filler line such that fuel vapour may flow into the fuel tank via the filler line.

14. The fuel filler device of claim 9, further comprising a latch device to connect the attachment to the flow conduction device.

15. A fuel filler device, comprising:
a flow conduction device arranged in a filler line to guide and support an outlet pipe of a pump nozzle during a filling sequence; and
an attachment body connected to the flow conduction device, the attachment body tapering between a first attachment body end and a second attachment body end, the first attachment body end include a plurality of spaced apart spacer ribs that extend radially inward towards the flow conduction device to define a plurality of gaps that are configured to relieve pressure during a filling sequence by facilitating flow of fuel vapour introduced into the fuel filler device into the filler line in a direction of a fuel tank which is connected to the filler line.

16. The fuel filler device of claim 15, wherein the spacer ribs are spaced at regular intervals from each other.

17. The fuel filler device of claim 15, further comprising a latch device to connect the attachment body to the flow conduction device.

* * * * *